United States Patent [19]

Kuhlmann et al.

[11] Patent Number: 4,493,865

[45] Date of Patent: Jan. 15, 1985

[54] PROTECTIVE MITTEN MADE OF METAL RING FABRIC

[75] Inventors: Gerhard Kuhlmann; Gerhard Schleihauf; Emil Brandauer, all of Mühlacker, Fed. Rep. of Germany

[73] Assignee: Friedrich Munch GmbH & Co. K.G., Mühlacker, Fed. Rep. of Germany

[21] Appl. No.: 541,995

[22] Filed: Oct. 14, 1983

[30] Foreign Application Priority Data

Oct. 18, 1982 [DE] Fed. Rep. of Germany ....... 3238499

[51] Int. Cl.³ .............................................. D04B 1/28
[52] U.S. Cl. .......................................... 428/52; 2/16; 2/20; 2/158; 2/161 R; 2/167; 2/243 A; 2/337; 428/53; 428/54; 428/209; 428/256; 264/544; 264/555

[58] Field of Search .................. 2/16, 20, 158, 161 R, 2/167, 243 A, 337; 428/32, 44, 52, 53, 54, 195, 209, 256; 264/544, 555

[56] References Cited

FOREIGN PATENT DOCUMENTS 3023990 1/1982 Fed. Rep. of Germany ............ 2/16

Primary Examiner—Marion E. McCamish
Attorney, Agent, or Firm—Balogh, Osann, Kramer, Dvorak, Genova & Traub

[57] ABSTRACT

In a protective mitten made of a metal ring fabric, at least one portion of the fabric is embedded in an elastomeric anti-skid material so that a firmer grip can be exerted with the mitten.

29 Claims, 6 Drawing Figures

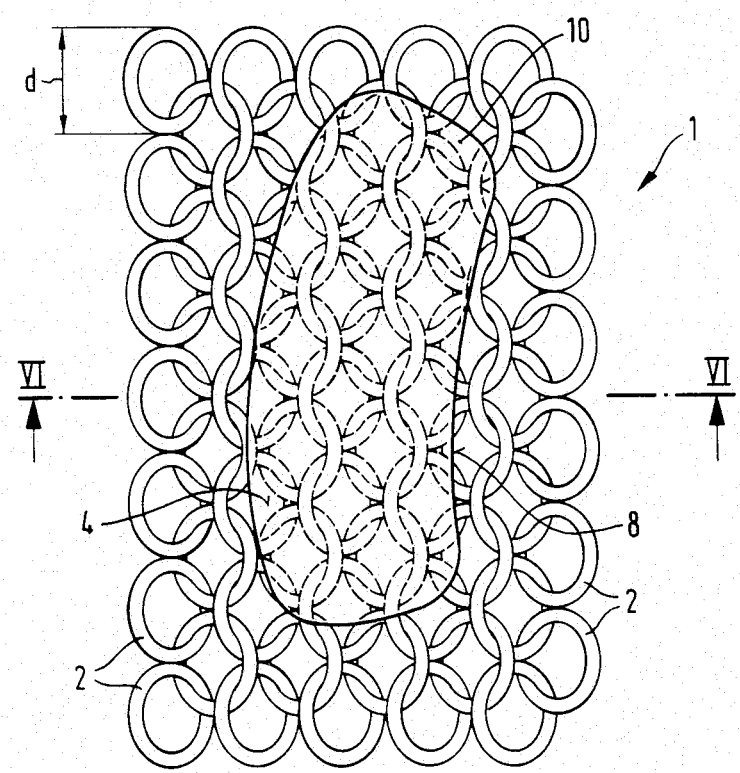
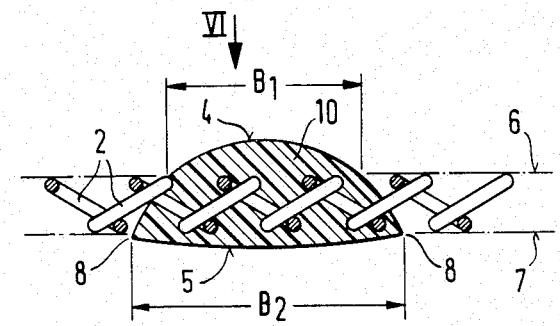

PROTECTIVE MITTEN MADE OF METAL RING FABRIC

This invention relates to a protective mitten comprising a metal ring fabric.

Protective mittens made of metal ring fabrics are worn by persons who are handling tools or other objects which involve a particularly high risk of cutting into the hands. Such persons are, e.g., butchers or workers who are employed in the glass industry and must handle sharp-edged glass panes, or workers who are employed in the metal industry and must handle metal plates. Only a few of the possible uses of such protective mittens have been mentioned above. Such mittens should afford an adequate protection from injury but should not render the handling of objects too difficult. For this reason the protective mittens should consist of a highly flexible metal fabric, which easily adapts itself to the hand and presents only a minimum obstruction to movements of the hand and of the fingers, particularly during grasping actions. Metal ring fabrics have proved highly satisfactory for that purpose. A metal ring fabric is a metal fabric composed of freely interlacing metal rings.

Owing to the material used in the previously known protective mittens made of a metal ring fabric, said mittens do not permit a firm grip. That disadvantage will be felt particularly in the handling of objects which have a smooth surface themselves.

It is an object of the invention to provide a protective mitten which comprises a metal ring fabric and permits a firmer grip.

This object is accomplished in that a portion of the metal ring fabric is embedded in elastomeric anti-skid material.

The invention is based on the recognition that for making a protective mitten consisting of a metal ring fabric and permitting a firm grip it is not necessary to provide a metal ring fabric which in its entirely permits a firm grip but it is sufficient to provide only one or more portions of the metal ring fabric with means which permit a firm grip. The reference to "portions" is not intended to mean that in the finished protective mitten the entire metal ring fabric which covers the inside of the hand may be provided with anti-skid material whereas all or part of the metal ring fabric contacting the back of the hand may be left free of anti-skid material. On the contrary, the reference to "portions" is intended to mean that in a mitten the metal ring fabric covering the inside of the hand is provided with anti-skid material only in one or more portions and in accordance with the invention is embedded in the anti-skid material in said portion or portions whereas the fabric is free of such anti-skid material in other areas covering the inside of the hand. The anti-skid material will suitably be provided only in those portions in which said material will actually permit a firmer grip, namely, adjacent to the fabric which covers the inside of the hand, whereas those portions of the fabric which cover the back of the hand as well as the fabric which is disposed between the fingers may be and preferably are entirely free of anti-skid material.

The required flexibility of the metal ring fabric is preserved because only one or more portions of said material are embedded in anti-skid material. If the metal ring fabric were coated with an anti-skid material throughout the region which covers the inside of the hand, e.g., by means of a dipping or spraying process, and the coating were sufficiently effective and durable, such protective mittens would be too stiff for practical use.

To ensure a sufficiently durable bond between the metal ring fabric and the anti-skid material, the metal ring fabric should be embedded in the anti-skid material and the latter should preferably extend through said fabric and cover the same on its outside and inside surfaces in those portions which are provided with the anti-skid material.

The anti-skid material provided on the metal ring fabric consists preferably of strips (which may be straight or curved) or of cakes on the metal ring fabric. Strips of anti-skid material may cross each other but crossing strips will not be preferred because they would stiffen the fabric and the mittens. To ensure that the flexibility of the fabric will be preserved as far as possible, the strips made of the non-skid material or the cakes made of such material and used instead of or in combination with such strips should not be larger than is required for a durable anchoring of such strips or cakes in the metal ring fabric. The strips or cakes should be wider than the largest diameter of the rings of the fabric and the area of the cakes should be three to fifteen times, preferably four to ten times, the area of a metal ring of the metal ring fabric; in that connection the area of the metal ring is the area which is defined by the outside periphery or which corresponds to the outside diameter of the ring.

In typical metal ring fabrics consisting of circular rings said outside diameter amounts to between 2 mm and 6 mm. Cakes having an area between 30 $mm^2$ and 100 $mm^2$, preferably about 60 $mm^2$, have proved satisfactory in practice.

A metal ring fabric provided with cakes of anti-skid material will have a higher flexibility than a metal ring fabric provided with strips of anti-skid material. For this reason, anti-skid material in the form of cakes will be preferred.

The strips or cakes of anti-skid material should be predominantly convex at least on the outside surface of the metal ring fabric which constitutes the protective mitten. This means that such strips or cakes would appreciably protrude from the outside surface of the metal ring fabric. That design permits a firmer grip and improves the resistance to wear. The anti-skid material can be anchored more firmly in the metal ring fabric and a cushioning effect will be achieved if the strips or cakes are convex also on the inside surface of the metal ring fabric although the convexity of said strips or cakes on the inside surface of the fabric is preferably smaller than the convexity on the outside surface of the fabric. The statement "predominantly convex" is intended to mean that the strips or cakes should have an elevated surface particularly in a central portion of their width whereas the edge portions of the strips or the rim of the cakes desirably merges into the metal fabric with a smaller rather than high inclination so that the surface which is presented by the cakes or strips at their edges or rim and which permits a rubbing off of the anti-skid material from the metal ring fabric will be as small as possible.

From that aspect it will be particularly desirable to cover the metal ring fabric on its inside surface with the anti-skid material in a larger area than on the outside surface of the fabric becuase in that case the rim of the cakes or the edge portions of the strips, i.e., those portions of the anti-skid material where the latter is particularly likely to be rubbed off, can be arranged in the interior or even on the inside surface of the fabric and will be protected there.

Special advantages will be afforded by the use of lenticular cakes which are made of anti-skid material and are anchored in the metal ring fabric. Such cakes may be slightly larger in diameter on the inside surface of the mitten than on the outside thereof and may have a larger radius of curvature on the inside surface of the mitten than on the outside thereof. A firmer grip will be permitted by such protective mitten made of a metal ring fabric if each cake, particularly each lenticular cake, is provided at the center of its outside surface with a flat or with a shallow depression.

The anti-skid materials may preferably consist of elastomeric plastic materials, particularly of silicone.

In a process which is particularly suitable for making a protective mitten according to the invention, a portion of a metal ring fabric which is not yet provided with anti-skid material is placed between two semimonocoques of a two-part mold, a charge of molding material for making the anti-skid material is introduced in a preselected quantity under pressure through a central opening in one of the semimonocoques, preferably the semimonocoque lying on top of the portion of the metal ring fabric, and the two semimonocoques are removed when the molding material has solidified to form an elastomeric anti-skid material.

The metal ring fabric used in that process can be made in a manner which is known in the art and for this reason need not be described here. In that process a portion of the metal ring fabric may be provided with the anti-skid material in the form of a strip or cake, preferably a lenticular cake. In the process, the metal ring fabric placed into the mold will prevent the mold to be closed entirely so that part of the material which has been injected will laterally emerge from the hollow mold so that the anti-skid material will have a somewhat irregular contour. Both that irregular contour will not adversely affect the significant properties of the strips or cakes, particularly lenticular cakes of the anti-skid material. The two semimonocoques of the hollow mold can be removed when the molding material has adequately solidified or hardened so that the strips or cakes will preserve their shape. Measures which may be adopted to accelerate the hardening of elastomeric materials are known in the art and may be adopted in the present process.

Elastomeric plastic materials, particularly silicone rubbers, can be used as anti-skid materials within the scope of the invention and will facilitate the carrying out of the abovementioned process and will result in a protective mitten which is highly durable and permits of a firm grip.

In the preferred practice of the invention, the metal ring fabric is provided with the anti-skid material after a protective mitten has been made from the fabric. In that case the portion or portions to be provided with the anti-skid material can be selected in a particularly convenient and reliable manner, which can easily be reproduced, e.g., when a template is used which matches the configuration of the mitten.

Illustrative embodiments of protective mittens according to the invention are shown on the accompanying drawings, in which FIG. 1 is a fragmentary top plan view showing a metal ring fabric which in a protective mitten is disposed on the inside of the hand; a lenticular cake of elastomeric material is anchored in a portion of said fabric;

FIG. 5 is a fragmentary top plan view showing a metal ring fabric which in a protective mitten is disposed on the inside of the hand; a strip of elastomeric material is anchored in a portion of said fabric;

FIG. 6 is a sectional view taken on line VI—VI of FIG. 5.

In various Figures, identical reference characters have been used to designate identical or corresponding parts.

The metal ring fabric 1 shown on the drawings consists in all embodiments of identical circular rings 2. In the interior of the fabric, each ring 2 is interlaced with four adjacent rings. Each of the rings 2 at the edges of the fabric and at seams provided at finger portions of the gove is interlaced with a smaller number of rings.

Figure 1:
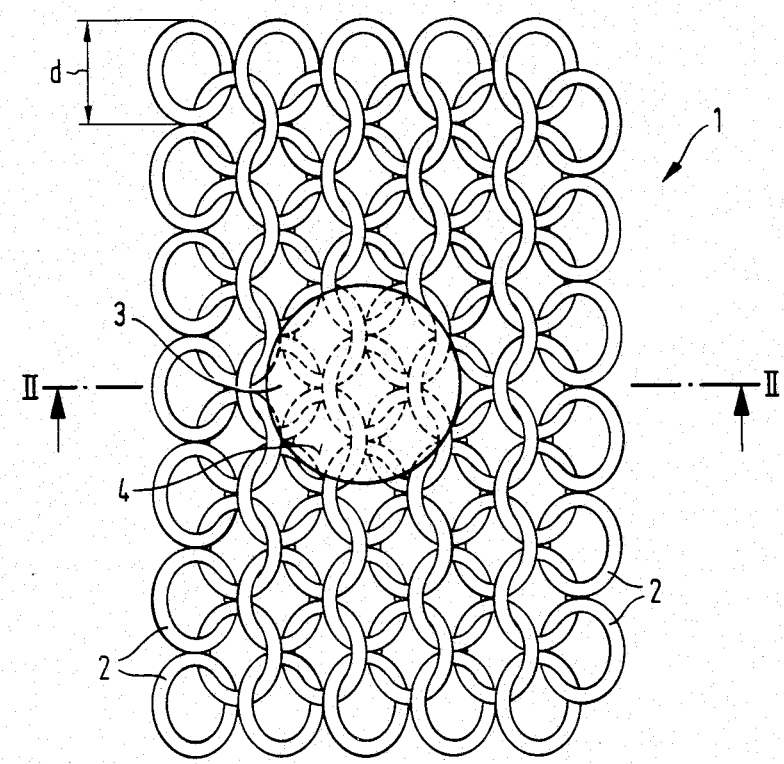
Figure 2:
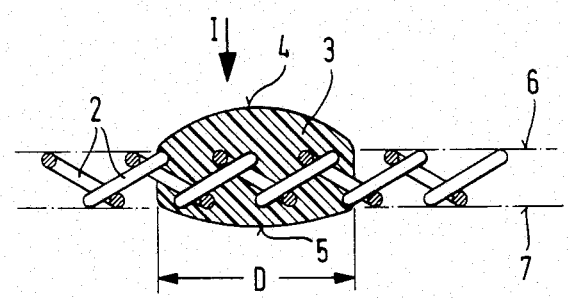
FIG. 2 is a sectional view taken through on line II—II of the fabric of FIG. 1.

In the embodiment shown in FIGS. 1 and 2, a portion of the metal ring fabric 1 is embedded in a biconvex lenticular cake 3 of elastomeric material, particularly plastic material.

On the outside surface of the mitten, the outer portion 4 of the lenticular cake 3 covers the outside surface 6 of a portion of the metal ring fabric. On the inside surface of the mitten, the lenticular cake 3 has an inside portion 5, which has a larger radius of curvature than the outside portion 4 and covers a corresponding area of the inside surface 7 of the fabric. The diameter D of the lenticular cake 3 is about twice the outside diameter d of a ring 2.

Figure 3:
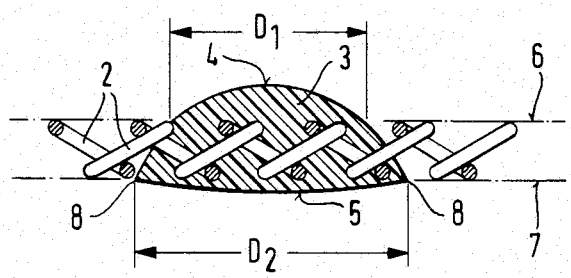
FIG. 3 is a view that is similar to FIG. 2 and shows a modified lenticular cake.

Another lenticular cake 3 of elastomeric material, preferably plastic material, is shown in FIG. 3 and differs from the lenticular cake 3 shown in FIG. 2 in that on the level of the outside surface 6 of the fabric 1—that level is indicated by the dotted line representing a plane which is tangent to the outside surface of the fabric—the lenticular cake 3 of FIG. 3 has a diameter $D_1$ which is smaller than the diameter $D_2$ of said cake on the level of the inside surface 7 of the fabric—that level is indicated by the dotted line representing a plane which is tangent to the inside surface of the fabric. In this arrangement the rim 8 of the lenticular cake 3 is disposed close to the inside surface of the fabric rather than on the outside surface of the fabric 1 so that said rim is protected from being rubbed off.

Figure 4:
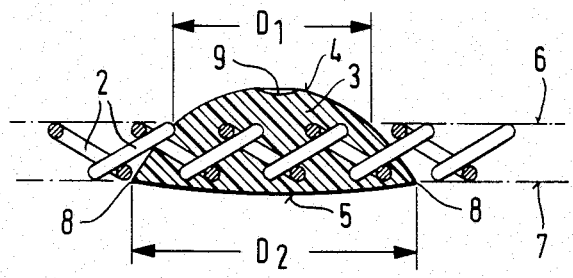
FIG. 4 is a view that is similar to FIG. 3 and shows another modified lenticular cake.

The lenticular cake 3 shown in FIG. 4 consists also of elastomeric material, particularly plastic material and differs from the lenticular cake shown in FIG. 3 by having on its outside surface 4 at its center a shallow depression 9, which will permit an even firmer grip.

FIG. 5 is a fragmentary view showing a portion of a metal ring fabric 1, which is partly embedded in a strip 10 of elastomeric material, preferably plastic material. The strip 10 is arcuate; that configuration may be desirable for an improved adaptation to contours and motions of a hand.

Obviously, portions of the metal ring fabric might be embedded in strips having different configurations.

FIG. 6 is a transverse sectional view showing the strip 10 of FIG. 5; it is apparent that the cross-sectional shape of the strip 10 is similar to that of the lenticular cake 3 in FIG. 3 inasmuch as the outside surface 4 is more highly convex than the inside surface and the width $B_2$ of the strip 10 on the inside surface 7 of the fabric exceeds the width $B_1$ of the strip 10 on the outside surface of the fabric; besides, both widths $B_1$ and $B_2$ exceed the outside diameter d of a ring.

In the drawings, the configurations of the rims or edges 8 of the lenticular cakes 3 or of the strip 10 are generalized; the configuration of said rims and edge portions will usually be irregular in practice.

What is claimed is:

1. In a protective mitten comprising a metal ring fabric, the improvement residing in that said fabric comprising at least one portion which is embedded in elastomeric material and at least one area which is free of elastomeric material.

2. The improvement set forth in claim 1, wherein said elastomeric material is disposed on the inside and outside surfaces of said mitten and extends through said fabric.

3. The improvement set forth in claim 1, wherein said elastomeric material constitutes at least one strip.

4. The improvement set forth in claim 3 as applied to a mitten in which said fabric has an inside surface defining a cavity said mitten and an outside surface opposite to said inside surface, wherein said strip has an outwardly convex outside surface portion on said outside surface of said fabric.

5. The improvement set forth in claim 4, wherein said strip has an inwardly convex inside surface portion on said inside surface of said fabric.

6. The improvement set forth in claim 5, wherein said inside surface portion of said strip has a larger radius of curvature than said outside surface portion of said strip.

7. The improvement set forth in claim 3 as applied to a mitten in which said fabric has an inside surface defining a cavity in said mitten and an outside surface opposite to said inside surface, wherein said strip covers said fabric on said outside and inside surfaces and has a smaller width on said inside surface than on said outside surface.

8. The improvement set forth in claim 3 as applied to a mitten in which said fabric has an inside surface defining a cavity in said mitten and an outside surface opposite to said inside surface, wherein said cake covers said fabric on said inside and outside surfaces and in a plane that intersects said fabric at right angles thereto has a larger section area on said outside surface than on said inside surface.

9. The improvement set forth in claim 1, wherein said elastomeric material constitutes at least one cake.

10. The improvement set forth in claim 9 as applied to a mitten in which said fabric has an inside surface defining a cavity in said mitten and an outside surface opposite to said inside surface, wherein said cake has an outwardly convex outside surface portion on said outside surface of said fabric.

11. The improvement set forth in claim 10, wherein said cake has an inwardly convex inside surface portion on said inside surface of said fabric.

12. The improvement set forth in claim 11, wherein said inside surface portion of said cake has a larger radius of curvature than said outside surface portion of said cake.

13. The improvement set forth in claim 9, wherein said cake is lenticular.

14. The improvement set forth in claim 9, wherein said cake has a largest section area of 30 mm$^2$ to 100 mm$^2$.

15. The improvement set forth in claim 9, wherein said cake has a largest section area of about 60 mm$^2$.

16. The improvement set forth in claim 9, as applied to a protective mitten in which said metal ring fabric consists of identical metal rings in said portion of said fabric, wherein said cake has a largest section area which is three to fifteen times the area enclosed by the outside periphery of each of said rings.

17. The improvement set forth in claim 16, wherein said cake has a largest section area which is four to ten times the area enclosed by the outside periphery of each of said rings.

18. The improvement set forth in claim 17, wherein said metal rings are circular.

19. The improvement set forth in claim 1, wherein said elastomeric material consists of an anti-skid material.

20. The improvement set forth in claim 1, wherein said elastomeric material consists of plastic material.

21. The improvement set forth in claim 1, wherein said elastomeric material consists of a silicone plastic.

22. The improvement set forth in claim 1 as applied to a mitten wherein said metal ring fabric comprises an inner portion arranged to contact the inside of a hand covered by said mitten, wherein said inner portion is only in part embedded in said elastomeric material.

23. The improvement set forth in claim 22 as applied to a mitten in which said metal ring fabric comprises an outer portion arranged to contact the back of a hand covered by said mitten, and finger-separating portions adapted to contact confronting surfaces of fingers of such hand, wherein said outer portion and said finger-separating portions are free of said elastomeric material.

24. In a metal ring fabric for use in a protective mitten,
the improvement residing in that at least one portion of said fabric is embedded in elastomeric material whereas at least one area of said fabric is free of elastomeric material.

25. In a process of manufacturing a protective mitten comprising a metal ring fabric,
the improvement residing in that
only a portion of a metal ring fabric which is free of elastomeric material is placed between two semimonocoques which constitute a two-part mold and one of which has a central opening,
a charge of a molding material for making an elastomeric material is introduced into said mold under pressure through said central opening in a predetermined quantity,
said charge is permitted to solidify in said mold so as to form an elastomeric material embedding said portion of said fabric, and
said semimonocoques are removed from said portion and said elastomeric material when said charge has solidified.

26. The improvement set forth in claim 25, wherein said portion of said fabric is placed between upper and lower semiminocoques which constitute said mold and said charge is introduced into said mold through a central opening in said upper semiminocoque.

27. The improvement set forth in claim 25 as applied to a process in which a protective mitten is formed from said metal ring fabric, wherein
a portion of said metal ring fabric is placed between said semimonocoques when said mitten has been formed from said metal ring fabric.

28. The improvement set forth in claim 27 as applied to a process in which a protective mitten is made in which said metal ring fabric comprises an inner portion arranged to contact the inside of a hand covered by said mitten, wherein said inner portion is only in part placed between said two semimonocoques.

29. In a process of manufacturing a metal ring fabric for use in a protective mitten, the improvement residing in that only a portion of a metal ring fabric which is free of elastomeric material is placed between two semimonocoques which constitute a two-part mold and one of which has a central opening, a charge of a molding material for making an elastomeric material is introduced into said mold under pressure through said central opening in a predetermined quantity, said charge is permitted to solidify in said mold so as to form an elastomeric material embedding said portion of said fabric, and said semimonocoques are removed from said protion and said elastomeric material when said charge has solidified.

* * * * *